United States Patent

[11] 3,545,696

[72] Inventor David F. Berkey
Minneapolis, Minn.
[21] Appl. No. 765,824
[22] Filed Oct. 8, 1968
[45] Patented Dec. 8, 1970
[73] Assignee Minnesota Mining and Manufacturing Company
St. Paul, Minn.
a corporation of Delaware

[54] ADHESIVE-ASSEMBLED MAGNETIC-TAPE REEL
2 Claims, 3 Drawing Figs.

[52] U.S. Cl. .......... 242/71.8
[51] Int. Cl. .......... B65h 75/18
[50] Field of Search .......... 242/71.8(A), 71.8

[56] References Cited
UNITED STATES PATENTS
3,088,689 5/1963 Perlini .......... 242/71.8(A)UX
3,236,473 2/1966 Hultgren .......... 242/71.8(A)UX
3,327,960 6/1967 Hedin .......... 242/71.8(A)UX

*Primary Examiner*—Nathan L. Mintz
*Attorney*—Kinney, Alexander, Sell, Steldt & Delahunt

ABSTRACT: A tape reel for mounting magnetic recording tape thereon wherein two plastic flanges are alined with and adhesively affixed to a metal hub.

INVENTOR.
DAVID F. BERKEY
BY Kinney, Alexander, Sell, Steldt & DeLa Hunt
ATTORNEYS

ADHESIVE-ASSEMBLED MAGNETIC-TAPE REEL

BACKGROUND OF THE INVENTION

Those skilled in this art are continuously striving to develop a magnetic recording tape reel that is more economical to produce and yet meets the critical standards of durability and precision required by the computer industry. Many prior art devices, in an effort to meet these goals, are constructed of a lightweight metal hub and two plastic flanges.

The metal hub is utilized to provide structural rigidity which will withstand the crushing load applied to the hub when an appreciable length of tape is wound thereon; to provide structural rigidity to minimize deflections and oscillations within the hub especially when magnetic tape is being wound thereon or therefrom; and to provide a material that may be precisely machined to ensure proper alignment between the magnetic tape and the computer machine.

The protective flanges, which in normal use do not engage the tape wound or being wound on the metal hub, are often constructed of a lightweight plastic material that permits economical production of the flanges and sufficient protection of the magnetic tape. The plastic material is light in weight to minimize inertia forces, due to the quick starting and stopping of the tape reel by the computer, and structurally tough to provide tape guidance and protection when necessary.

The longfelt need has been to develop an economical and structurally adequate means of securing the plastic flanges to the metal hub. The securing means must be rigid to prevent a flange, under a constant tape-engaging stress, from creeping away from the metal hub; rigid to maintain the flanges perpendicular to the axis of rotation thus to minimize the flanges from contacting and fraying the magnetic tape; and structurally durable to withstand the operational stresses, caused by accelerant and decelerant forces, and the thermal stresses caused by the different coefficients of expansion of the dissimilar materials. Relatively complex mechanical structures and attachments have been previously utilized to adequately secure the plastic flanges to the metal hubs. For example, see the tape reel of Perlini, U.S. Pat. No. 3,088,689, wherein self-tapping screws are utilized to rigidly secure the plastic flanges to the metal hub, and U.S. Pat. No. 3,327,960, wherein Hedin utilizes mechanically interlocking beads and detents in combination with an adhesive to adequately secure the plastic flanges to the metal hub.

SUMMARY OF THE INVENTION

The present invention relates to an improved tape reel useful for mounting magnetic tape thereon and more particularly to a new and improved means of adhesively affixing a plastic flange to a metal hub.

Thus, a principal object of this invention is to provide a simplified means for affixing a plastic flange to a metal hub.

Other objects and many of the attendant advantages of this invention will be readily appreciated as the same becomes better understood by reference to the following detailed description when considered in connection with the accompanying drawings in which like numerals designate like parts throughout the FIGS. and wherein.

Figures 1, 2, 3:
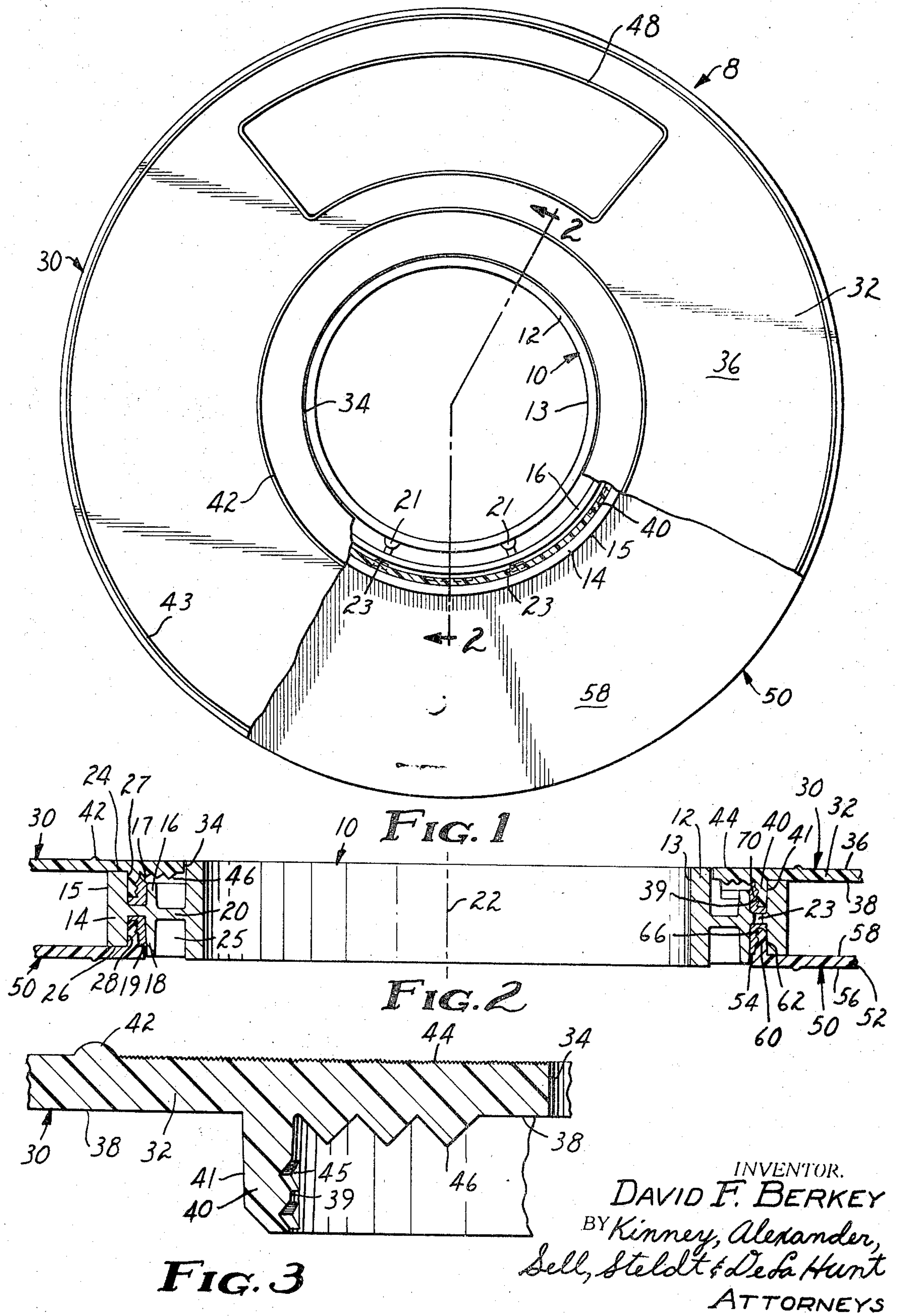
FIG. 1 is a front view, partially cut away, of a preferred embodiment of the invention.
FIG. 2 is an enlarged section of the reel taken on line 2–2 of FIG. 1 looking in the direction of the arrows.
FIG. 3 is an enlarged sectional view of the front flange of FIG. 2.

In the accompanying drawing and description of the invention shown, the flange closest to the viewer in FIG. 1 will be referred to as "front" flange of the magnetic recording tape reel and the flange opposite therefrom is the "rear" flange of the reel. The axis extending through the centers of the "front" and "rear" flanges in the "longitudinal axis" of the reel. That which is between the "front" and "rear" flange is "longitudinally inner" and the opposite therefrom is "longitudinally outer." That which is relatively closer to the "longitudinal axis" is "radially inner" of that which is "radially outer" from the "longitudinal axis."

Referring now to the embodiment of FIG. 1, there is shown a circular tape reel 8 comprising a metal hub 10, a front plastic flange 30 and a rear plastic flange 50.

The hub 10, which is best shown in the cross-sectional view of FIG. 2, may be constructed of an aluminum or magnesium alloy or other similarly low density metallic material and comprises a circular band 12, a tape receiving rim 14, a cylindrical front partition 16, a cylindrical rear partition 18 and a radially extending web 20 interconnecting the rim 14, band 12, and partitions 16, 18.

The circular band 12 includes a machined inner face 13, machined about the longitudinal axis 22 of the reel, to closely fit onto the reel supporting arbor (not shown) of the computer machine.

The tape receiving rim 14, a critical portion of the reel, must be precisely machined to provide proper alignment between the flanges 30, 50, the hub 10, the magnetic tape thereon and the magnetic sensing portion of the computer machine. The tape receiving surface 15 of the rim 14 is coaxially machined, relative to the inner face 13, to minimize the radial runout and the stresses within the tape being wound thereon or therefrom. The coaxial machining of the surface 15 also minimizes the possibility of the magnetic tape being wound unevenly against a protective flange, causing fraying of the tape and the flange to structurally creep away from the hub. The annular front support surface 24 and the annular rear support surface 26 are precisely machined perpendicular to the longitudinal axis 22 and parallel to each other. For example, in the preferred embodiment, the front and rear support surfaces are each machined within three one-thousandths of an inch parallel to an absolutely flat reference plane. These parallel support surfaces 24, 26 thus define parallel planes which support and align the plastic flanges 30, 50 perpendicular to the axis of rotation and parallel to each other. An applied adhesive 70 (as will be more fully described hereinafter) will then maintain the flanges in proper alignment throughout the life of the tape reel. The front cylindrical locating race 27 and rear cylindrical locating race 28, of the rim 14, are machined parallel to the longitudinal axis 22 between the web 20 and the support surfaces 24, 26 to ensure concentric locating of the flanges 30, 50 to the hub 10; and machined to a dimension slightly greater than the diametrical dimension on faces 41, 62 to ensure that the flanges 30, 50 annularly engage the support surfaces 24, 26.

The cylindrical front partition 16, formed on the web 20 between the band 12 and rim 14 defines an annular front groove 17. The cylindrical rear partition 18 formed on the web 20 between the band 12 and rim 14, defines an annular rear groove 19 and an annular trough 25 into which there is deposited a plastic ring (not shown) to prevent accidental erasing of the tape. The interconnecting web 20 further comprises eight equally spaced reinforcing buttresses 21, to strengthen the web, and eight equally spaced holes 23 to provide an adhesive flow connection between the grooves 17, 19.

The front plastic flange 30, which may be formed from a relatively clear polyacrylonitrile or similar material, comprises a generally annulus-shaped plate 32 having a central opening 34, a substantially flat outer plate surface 36 and a substantially flat inner plate surface 38. The flange 30 further comprises an annular locating ring 40, formed on the inner plate surface 38, having a cylindrical outer face 41, of a diametrical dimension slightly less than the diametrical dimension of the locating race 27, for coaxially locating the flange 30 to the hub 10. The outer plate surface 36 further comprises an inner bead 42 and an outer bead 43, to protect the plate surface from becoming marred when the reel is placed on a table or such, and acid etching 44 (as shown in FIG. 3) of the area radially inward of the inner bead to destroy the transparency of flange material within this area and thus restrict the viewing of the reinforcing buttresses 21. The inner plate surface 38, as more clearly shown in FIG. 3, comprises three annular light reflecting beads 46, triangular in cross section, to further restrict viewing of the reinforcing buttresses 21. The radially inner cylindrical face 39 of the ring comprises six sets, equally spaced around the annular ring 40, of adhesive interlocking notches 45 to provide greater mechanical and chemical adhesion between the adhesive 70 and the flange. Each set includes two determinate notches of approximately one-half inch in length. An arcuate rectangular bead 48 is formed on the front plate surface 36 to receive a label or other indicia concerning the tape being stored on the reel.

The rear plastic flange 50, which may be formed from an opaque blue polyacrylonitrile or similar material, comprises a generally anulus-shaped plate 52 having a central opening 54, a substantially flat outer plate surface 56 and a substantially flat inner plate surface 58. The flange further comprises an annular locating ring 60, formed on the inner surface 58, having a radially outer face 62 of a diametrical dimension slightly less than the diametrical dimension of the locating race 28, for coaxially locating the flange 50 to the hub 10. The rear plate surface 56 further comprises inner and outer protective beads 64, as similarly used on the front flange 30. The locating ring 60 further comprises six sets, equally spaced around the ring 60, of adhesive interlocking determinate notches 66 also to provide greater adhesion. Each set includes two determinate notches of approximately one-half inch in length.

At the present time, there are no all-purpose adhesives that combine all of the desired properties for a wide variety of bonding applications, and it is unlikely that there ever will be such an adhesive. There are hundreds of metals listed in the various reference books and there are hundreds of plastics listed in the Modern Plastic Encyclopedia and each has its place in the world of designing properties. The correct adhesive must be fitted or developed for the specific adherends and requirements of the application.

A preferred adhesive for use with the above-described embodiment is a room temperature curing two-component system, one part of which comprises epoxy resin and the other part, a curing agent. Part A is a mixture of 60 parts by weight of a liquid polyglycidyl ether of bisphenol A (e.g., "Epon" 828) and 40 parts by weight of powdered talc (e.g., "Fibrene" C-400). Part B is a mixture by weight of: 10.9 parts of aminoethyl piperazine; 18.2 parts of "Polyamide A" of U.S. Pat. No. 3,257,342; 20.9 parts of triphenyl phosphite; 4.1 parts of ammonium organic complex in magnesium montmorillonite (e.g., "Bentone 34"); 1 part of fluorescent pigment (e.g., "Calcofluor White RW"); and 44.9 parts of powdered talc. The mixed ingredients of part B are put through a 3-roll paint mill with both orifices at 2 mils to assure complete blending.

To assemble the tape reel 8, 45 parts by weight of part A and 55 parts by weight of part B of the adhesive are fed into an automatic mixing and dispensing unit, and the mixture is immediately directed into the grooves 17, 19 to partially fill the grooves. The mixed two-component epoxy adhesive 70 has a peanut-butterlike consistency so that it stays in place but its viscosity is such that it migrates into the notches 45, 66 and into the pores of the plastic and metal to form a mechanically interlocked adhesion. The adhesive has a wetting property to enable it to wet each adherend for establishing contact in molecular dimensions to result in a molecular chemical adhesion. The flanges 30, 50 are coaxially and perpendicularly aligned onto the hub, as previously set forth, with the rings 40, 60 protruding into the adhesive 70. The assembled reel is maintained in a jig in this aligned position until the adhesive is sufficiently cured, approximately 40 minutes, to enable subsequent handling. The cured adhesive is nonbrittle and of tough internal structural strength to provide a durable bonding between the adherends.

While one embodiment of the invention has been shown and described, it will be appreciated that this is for the purpose of illustration and that modifications may be made therein without departing from the spirit and the scope of the invention as set forth in the appended claims.

I claim:

1. A rotatable magnetic recording tape reel having a longitudinal axis, comprising:

1. a metal hub having
  a. a tape receiving rim,
  b. a cylindrical partition radially inward of said rim,
  c. a radially extending web interconnecting said rim and said partition and defining an annular groove between said rim and said partition, said web further including at least one hole for flowably connecting an adhesive to the opposite side of said web, and
  d. said rim comprising:
    1. a cylindrical tape receiving surface coaxial with the longitudinal axis,
    2. an annular support surface defining a plane perpendicular to the longitudinal axis, and
    3. a flat cylindrical locating race longitudinally extending from said web to said support surface;

2. a plastic flange having
  a. a central opening,
  b. a substantially flat inner plate surface in annular engagement with said annular support surface to perpendicularly align said flange to the longitudinal axis, and
  c. an annular locating ring extending longitudinally of said inner plate surface and protruding into said groove, said ring comprising a cylindrical outer face abutting said race for coaxially locating the flange to the hub, said ring including at least one determinate notch to provide greater adhering surface for an adhesive; and

3. an adhesive within said groove in mechanical and molecular contact with said ring and said hub for affixing said flange to said hub.

2. A tape reel according to claim 1 wherein said inner plate surface of said flange further comprises a plurality of light reflecting beads.